UNITED STATES PATENT OFFICE.

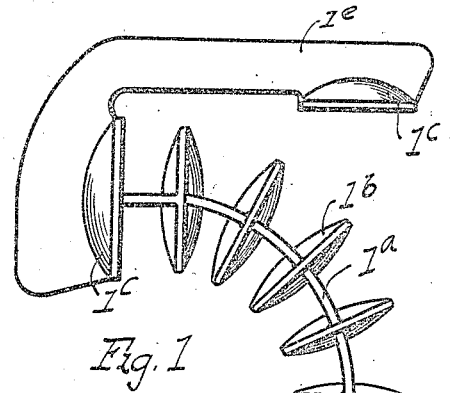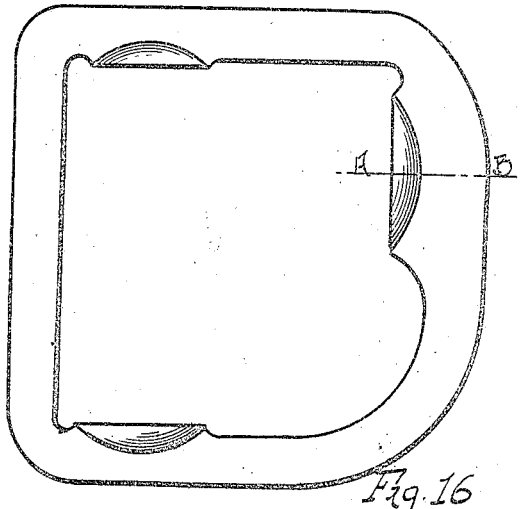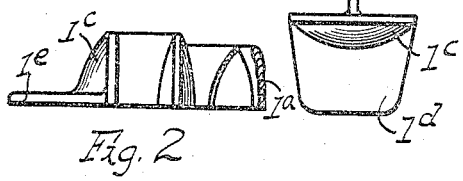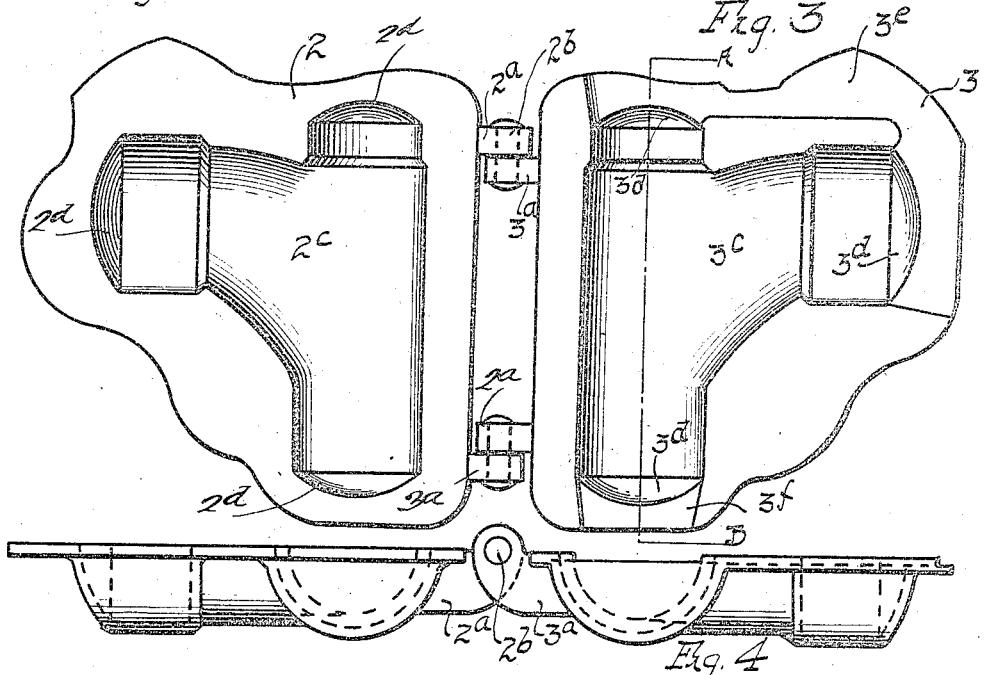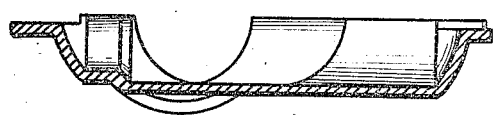

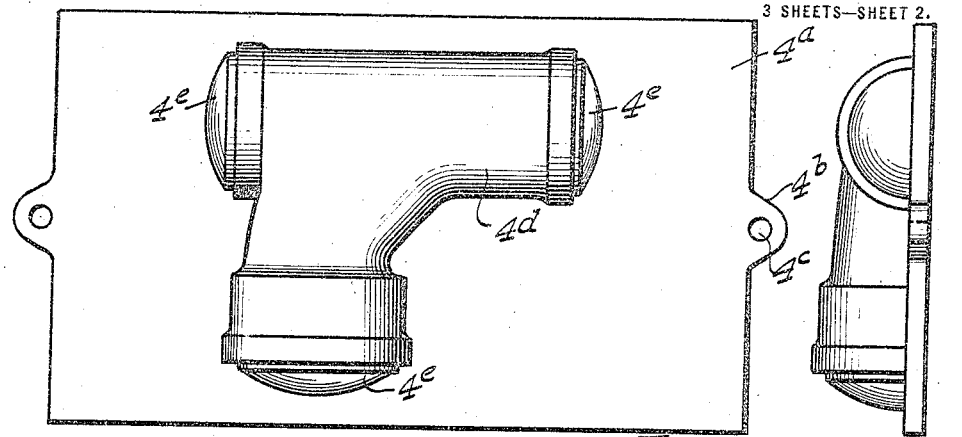
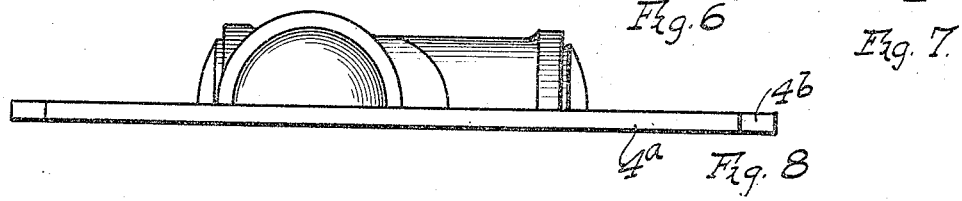
Fig. 6  Fig. 7  Fig. 8
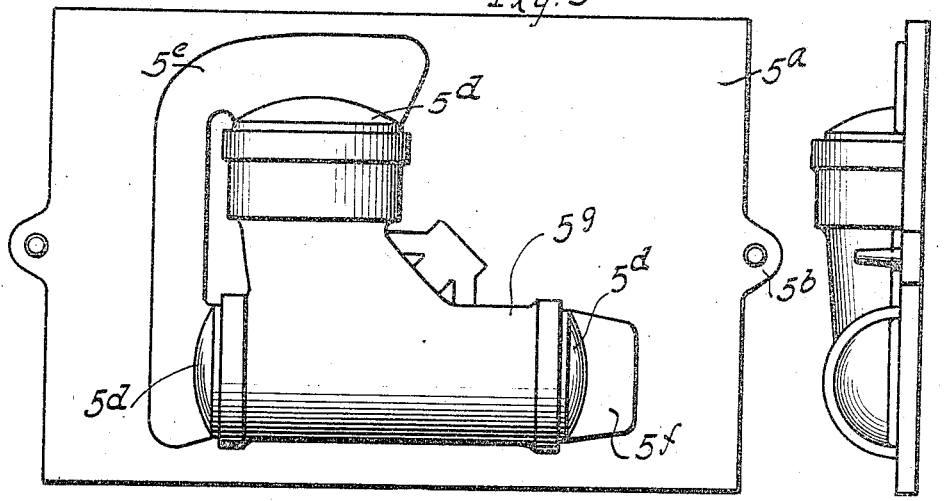
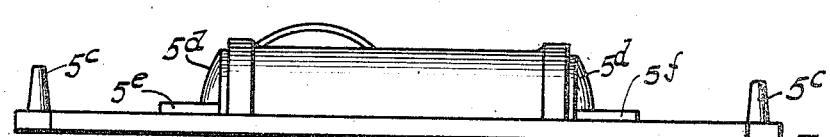
Fig. 9  Fig. 10  Fig. 11

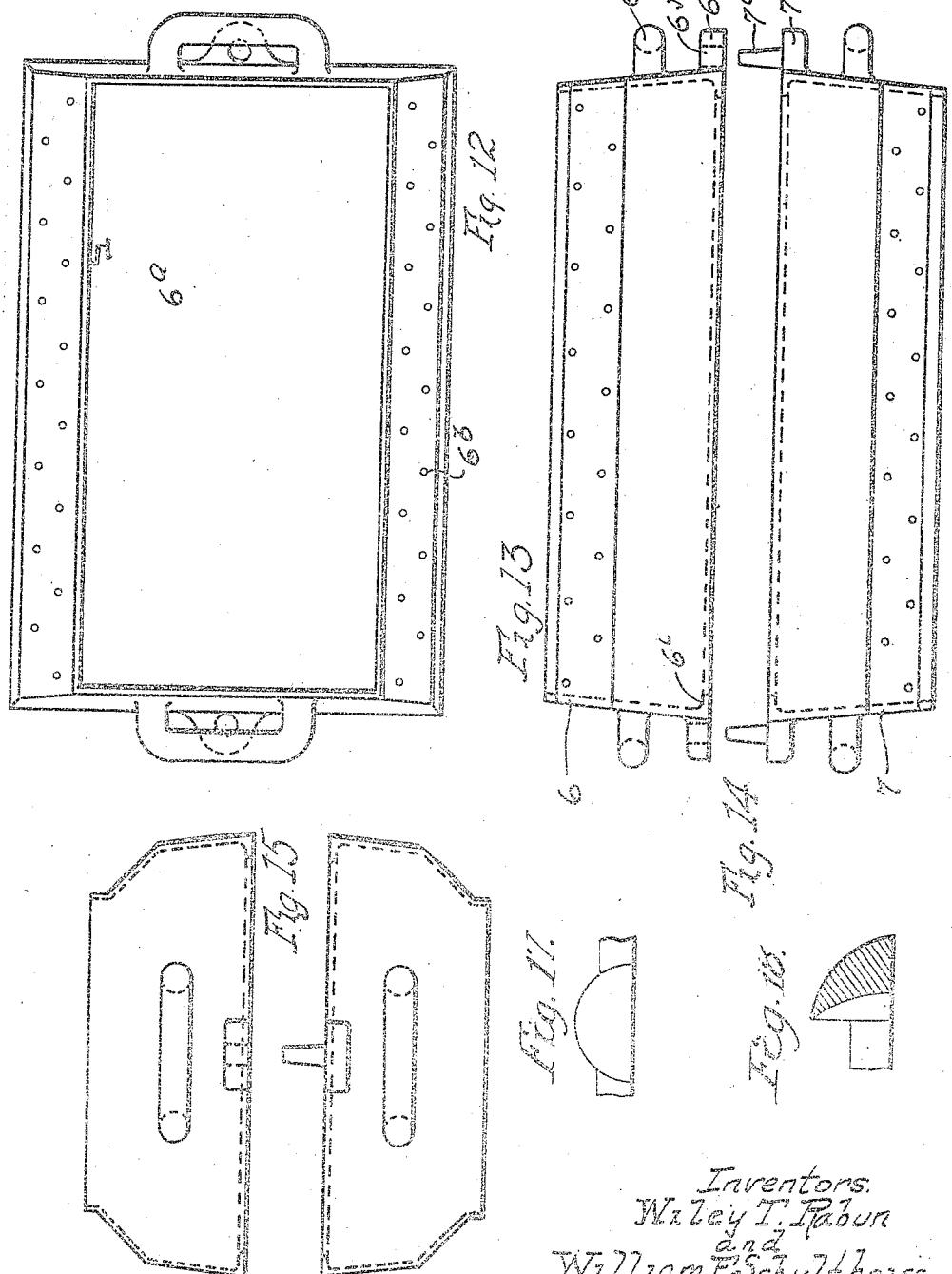

WILEY T. RABUN AND WILLIAM F. SCHULTHEISS, OF SAN DIEGO, CALIFORNIA.

EQUIPMENT FOR GREEN-SAND MOLDING.

1,252,945.   Specification of Letters Patent.   Patented Jan. 8, 1918.

Application filed February 24, 1916. Serial No. 80,252.

*To all whom it may concern:*

Be it known that we, WILEY T. RABUN and WILLIAM F. SCHULTHEISS, citizens of the United States, residing at San Diego, in the county of San Diego and State of California, have invented certain new and useful Improvements in Equipment for Green-Sand Molding, of which the following is a specification.

Our invention relates to equipment for making molds and green sand cores for casting purposes, and the objects of our invention are: first, to provide equipment of this class which will render the process of molding more expeditious and considerably cheaper; second, to provide equipment of this class which is simple of construction, durable, easy of operation and will not readily deteriorate or get out of order; third, to provide equipment of this class which may be readily used with equal success on jar ramming, molding machines, or hand ramming with or without vibrator; fourth, to provide equipment of this class by the use of which the bottom boards for the flask are eliminated; fifth, to provide equipment of this class which will produce perfect fitting parts and uniform castings without skilful operators in the operation; sixth, to provide equipment of this class in which the upkeep is reduced to a minimum; seventh, to provide equipment of this class which renders the interchangeable parts of the equipment perfect fitting and the wearing parts thereof durable.

With these and other objects in view as will appear hereinafter our invention consists of certain novel features of construction, combination and arrangement of parts as will be hereinafter described in detail and particularly set forth in the appended claims, reference being had to the accompanying drawings and to the characters of reference thereon which form a part of this specification.

We have illustrated and will hereinafter describe our equipment for making molds and cores for a sanitary or drainage soil pipe fitting, though it is obvious that the same equipment with the proper changes in form may be used with equal success for making molds and cores for any other castings which require a core.

In the drawings Figure 1 is a plan view of the core arbor with the arbor rest and shown in the reversed or up side down position to which it is used in the core box to facilitate the illustration thereof. Fig. 2 is a fragmentary side view of a portion thereof. Fig. 3 is a plan view of the core box showing the cope and drag halves in hinged relation to each other. Fig. 4 is a side view thereof. Fig. 5 is a sectional view through A—B of Fig. 3 through the drag half of the core box. Fig. 6 is a plan view of the cope half of the fitting pattern shown mounted on a plate. Fig. 7 is an end view thereof. Fig. 8 is a side view thereof. Fig. 9 is a plan view of the drag half of the fitting pattern shown mounted on a plate. Fig. 10 is an end view thereof. Fig. 11 is a side view thereof. Fig. 12 is a plan view of the flask. Fig. 13 is a side elevational view of the cope half of the flask. Fig. 14 is a similar view of the drag half. Fig. 15 is an end view of the flask complete. Fig. 16 is a plan view of a chilling device. Fig. 17 is a fragmentary inside elevational view showing one of the head recesses. Fig. 18 is a sectional view through A—B of Fig. 16.

Similar characters of reference refer to similar parts throughout the several views.

The arbor as shown in Figs. 1 and 2 of the drawings consists of the support $1^a$, lugs $1^b$, heads $1^c$ and rests $1^d$ and $1^e$. This arbor is placed in the sand together with the chilling device shown in Figs. 16, 17 and 18, and a mold made therefrom, after which the arbor is removed and a casting is made in the mold left by the removal of the arbor with the chilling device left in position in the sand so that the heads $1^c$ and the lower surfaces of the arbor rests $1^d$ and $1^e$ which contact with the chilling device are chilled and this casting is thereafter used as a working core arbor. The core box as shown in Figs. 3, 4 and 5 of the drawings consists of two parts 2 and 3 which are provided with lugs $2^a$ and $3^a$ in which are mounted pins $2^b$ for hinging the two parts 2 and 3 together. The parts 2 and 3 are provided with recesses $2^c$ and $3^c$, each conforming in shape to half of the core, the part 2 containing the cope half and the part 3 containing the drag half. This cope half of the core box is made in the ordinary or conventional manner, but the pattern for the drag half of the core box is placed in the sand together with the arbor casting so that the heads $1^c$ of said arbor casting rests in the print ends $3^d$ of said core box and the rest $1^e$ rests on the portion $3^e$ of said core box and the rest $1^d$ on the portion $3^f$ of said core box, the arbor casting being up side down from the position shown in Fig. 1 of the drawings, after which the core box pattern is removed from the sand and a casting poured in its mold with the arbor casting left in position in the sand, thus chilling the core box ends $3^d$ and the portion $3^e$ and $3^f$ of said casting which contacts with the arbor in the mold. The cope half of the pattern as shown in Figs. 6, 7 and 8 of the drawings consists of a rectangular shaped plate $4^a$ provided with plugs $4^b$ at each end thereof which are provided with holes $4^c$ adapted for the pins in the flasks as hereinafter described. Mounted on this plate $4^a$ is a pattern $4^d$ conforming to one-half of the fitting, also including ends $4^e$ which conform to the ends of the recess $2^c$. The drag half of the fitting pattern as shown in Figs. 9, 10 and 11 of the drawings consists of a rectangularly shaped plate $5^a$ provided with lugs $5^b$ on each end thereof which are provided with tapered pins $5^c$ on one side adapted to fit into the holes in the flask as hereinafter described. Mounted on the one side of this plate $5^a$ is the pattern $5^g$, conforming to the other half of the fitting pattern including the print heads $5^d$ and arbor rests $5^e$ and $5^f$ which correspond with the arbor rests $1^e$ and $1^d$ and heads $1^c$ shown in Figs. 1 and 2 of the drawings. A casting is then made by placing in the sand this pattern together with the chilling device shown in Figs. 16, 17 and 18 of the drawings after which this fitting pattern is removed and said chilling device remains in the sand and the iron poured into the mold left by removing the fitting pattern, thus chilling the print heads $5^d$ and arbor rests $5^e$ and $5^f$ of said casting which is thereafter used for a working pattern. The flask part of my molding equipment as shown in Figs. 12, 13, 14 and 15 of the drawing consists of a cope part 6 and a drag part 7. The cope part 6 is a rectangularly shaped frame with angular walls receding downwardly, the top being provided with a rectangularly shaped opening $6^a$. It is provided in the sides with a plurality of perforations $6^d$ to provide a vent for gases. It is provided around its lower inner edge with a web $6^c$ which is adapted to hold the sand in position in the flask. It is provided with a handle $6^d$ on each end and with lugs $6^e$ which are provided with holes $6^f$ adapted for the pins $5^c$ on the plate $5^a$ so as to hold the plate in a certain relative position to the flask. The drag half of the flask is similarly constructed throughout except that the lug $7^a$ on the ends are provided with pins $7^c$ instead of holes. These pins are adapted to fit in the holes $4^c$ in the plates $4^a$ for holding them in certain relative positions thereon. With the equipment as above described the molding is accomplished as follows: The drag part of the flask 6 is placed over the drag half of the plate $5^a$ and the lugs $6^e$ adjusted to fit perfectly over the pins $5^c$ thus eliminating all shifting movement of the flask. The mold is then rammed after which the flask containing the mold is lifted from the plate $5^a$ and placed on the floor without bottom boards being used by reason of the bevel of the flask. The core is then made by placing the arbor shown in Figs. 1 and 2 in the drag half 3 of the core box and after ramming sand in both halves of the core box which is done by top or side ramming only, the core box is folded together, the core box resting on the drag half. The cope half is then thrown back and the core is lifted out and placed in the drag half of the mold. A mold is then made from the cope half of the fitting pattern in the usual manner over the core and resting on the drag half of the mold and the mold is completed.

Though we have shown and described a particular construction, combination and arrangement of parts, we do not wish to be limited to this particular construction, combination and arrangement, but desire to include in the purview of our invention the construction, combination and arrangement substantially as set forth in the appended claims.

It is obvious that with this construction there is provided a molding equipment in which the different parts fit each other and are interchangeable, by reason of the chilling of the different parts by casting them in a mold against the part with which it is to engage in molding, that the wearing parts, namely, the arbor head, pattern prints and core box heads are all chilled, thus making them more durable and eliminating the necessity of sand prints and sand heads, that the equipment may be readily used with equal success on jar ramming, molding machines and hand ramming with or without vibrator, that by reason of the construction of the flask no bottom boards are necessary, thus lessening the cost of labor in molding and equipment up-keep, that by reason of the perfect fitting patterns, the castings will be of uniform thickness and strength, that by the use of this equipment the molding process will be rendered more expeditious and considerably cheaper, that the equipment is very simple of construction and easy of operation.

Having thus described our invention what we claim as new and desire to secure by Letters Patent, is:

1. In a molding equipment, the combination of core box members pivotally connected together, the drag member thereof provided with chilled ends and an arbor casting provided with chilled arbor heads adapted to rest therein.

2. In a molding equipment, the combination of fitting patterns mounted on plates, the drag member thereof provided with chilled print heads, core box members pivotally connected together, the core therefrom adapted to conform to said fitting pattern, the drag member of said core box members provided with chilled ends and an arbor casting provided with chilled arbor heads adapted to fit into the drag member of said core box.

3. In a molding equipment, the combination of tapered metallic flasks, fitting patterns mounted on plates adapted to fit on said metallic flasks, the drag portion of said fitting patterns being provided with chilling print heads, core box members pivotally connected together for forming cores adapted to conform with said patterns, the drag portion provided with chilled ends and an arbor casting provided with chilled arbor heads adapted to fit the drag half of said core box.

4. In a molding equipment, the combination of an arbor casting provided with chilled arbor heads, core box members pivotally connected together, the drag member provided with chilled ends against which the heads of the arbor casting are adapted to rest and chilling device means adapted to be molded with said arbor heads and core box ends for chilling them.

5. In a molding equipment the combination of an arbor casting provided with chilled arbor heads, core box members pivotally connected together, the drag member provided with chilled ends into which said arbor casting is adapted to fit, fitting patterns mounted on plates, the drag portion provided with chilled print heads which conform with the core from said core box and chilling device means adapted to be molded with said arbor heads, print heads and core box ends for chilling said print heads and core box ends.

6. In a molding equipment, the combination of an arbor casting provided with chilled arbor heads, core box members pivotally connected together, the drag portion provided with chilled ends, fitting patterns mounted on plates, the drag portion provided with chilled print heads conforming to the drag portion of the core box and arbor heads and arbor rests, tapered metallic flasks upon which said plates are positioned for molding and chilling device means for chilling said arbor heads and core box ends in the mold from which they are cast.

7. In a molding equipment, the combination of an arbor casting provided with metal arbor heads, core box members pivotally connected together, provided with metal ends into which said arbor casting is adapted to fit, fitting patterns mounted on plates, provided with metal print heads and tapered metal flasks upon which said plates are positioned for molding.

8. In a molding equipment the combination of an arbor casting provided with arbor heads and an arbor rest, core box members pivotally connected together provided with closed ends which form the core ends in the cope half and rest for arbor head in the drag half, fitting patterns mounted on plates provided with print heads conforming with the sand core print formed by said core box and the heads and rest of the arbor casting, and tapered metallic flasks upon which said plates are positioned for molding.

9. In a molding equipment the combination of an arbor casting provided with metallic heads and a metallic rest, core box members pivotally connected together provided with closed ends which form the core, fitting patterns mounted on plates provided with print heads conforming with the sand core print and the heads and rest of the arbor casting, the print heads of the drag half of the patterns conforming with the arbor head and arbor rest and the cope half of the print heads conforming with the said core print and the cope half of the core box.

In testimony whereof, we have hereunto set our hands at San Diego, California this 19 day of February 1916.

WILEY T. RABUN.
WILLIAM F. SCHULTHEISS.